United States Patent Office 3,497,007
Patented Feb. 24, 1970

---

3,497,007
MISCIBLE DRIVE OIL RECOVERY PROCESS
Robert E. Williams, Robert C. Ayers, Jr., and Claude E. Cooke, Jr., Houston, Tex., assignors to Esso Production Research Company, a corporation of Delaware
No Drawing. Continuation-in-part of application Ser. No. 590,458, Oct. 27, 1966. This application May 16, 1969, Ser. No. 825,438
Int. Cl. E21b 43/22
U.S. Cl. 166—273
5 Claims

ABSTRACT OF THE DISCLOSURE

In a process for the recovery of oil from a subterranean formation using as a first bank a polar organic solvent and as a second bank an aqueous surfactant solution, a tall oil additive is added to the polar organic solvent. The tall oil additive increases the oil recovery of the process.

CROSS REFERENCE TO RELATED APPLICATION

This application is a continuation-in-part of U.S. Patent application 590,458, Williams et al., filed Oct. 27, 1966, now U.S. Patent 3,444,930, issued May 20, 1969.

BACKGROUND OF THE INVENTION

Field of the invention

This invention relates to a process for recovering oil from a subterranean formation utilizing a well into which a fluid is injected and caused to enter the pores of the information. More particularly, this invention relates to a process for displacement and recovery of reservoir oil by injecting a first bank of polar organic solvent and tall oil additive into a reservoir followed by a second bank of an aqueous solution of surfactant. The two banks are driven into the formation by following flood water.

Description of the prior art

Miscible fluid and other types of drives involving the use of a leading bank of hydrocarbon solvent have long been regarded as the simplest method to obtain displacement efficiencies significantly higher than those characteristic of conventional waterflooding. Most of the work in solvent recovery has concentrated on multiple bank processes. Recent efforts have sought to provide at least two successively injected solvent banks: (1) a leading bank capable of miscibly displacing the crude oil, and (2) a second bank of solvent having mutual solubility with both the leading bank and with the following flood water. However, contamination of the two solvent banks with water or oil causes these banks to lose solubility with one another. Economic considerations generally prohibit the use of more than two banks.

To combat this problem it has been proposed to employ as a second bank a highly-concentrated solution of surface active agent or surfactant. The first bank in most instances is a polar organic material having a relatively high molecular weight and which is oil soluble. This bank is followed by an aqueous solution of a low molecular weight surfactant solution which in turn is driven through the reservoir by following flood water. A typical process of this type is disclosed in U.S. 3,373,809, Cooke.

One drawback of most such recovery processes is the tendency of the solvent front to finger through the reservoir and to bypass substantial portions of oil. This fingering tendency is usually explained by the fact that the solvent bank has the ability to move through the reservoir at a much faster rate than the oil which it is displacing. The fingering and bypassing tendencies of the solvent bank are due in part to its relatively low viscosity.

The fingering tendency of a fluid can be quantitatively described by the mobility ratio of the system. The mobility ratio of a flooding system is a mathematical relationship that has been developed in recent years to help explain the behavior of fluids flowing through porous media such as oil reservoirs. When the mobility ratio equation is applied to a "flooding" type operation within a reservoir it reads as follows:

$$\frac{M_o}{M_e} = \frac{\mu_e}{\mu_o} \times \frac{K_o}{K_e}$$

where $M_o$ is the mobility of the oil to the reservoir in question
$M_e$ is the mobility of the driving fluid to the reservoir in question
$\mu_o$ is the viscosity of the driven oil
$\mu_e$ is the viscosity of the driving fluid
$K_e$ is the relative permeability of the reservoir to the driving fluid in the presence of residual oil
$K_o$ is the relative permeability of the reservoir to the oil in the presence of interstitial water This equation is perhaps best explained by stating that when the mobility ratio of oil to the driving fluid is equal to one, the oil and the driving fluid move through the reservoir with equal ease. When the mobility ratio is less than one, there is a tendency for driving fluid to bypass the oil and finger to the producing well.

It should be noted that crude oils vary greatly in viscosity. Some have viscosities of one or two centipoises, and some range to 1,000 centipoises or greater. Most reservoir oil have a viscosity of up to 10 centipoises at reservoir temperature and pressure. If a solvent bank with a viscosity of approximately 5 centipoises is used to displace oil having a viscosity of 10 centipoises, it can be seen from the mobility ratio equation that there will be a tendency for the driving fluid to finger through the reservoir oil. It has in fact been noted that solvent processes generally perform less satisfactorily with viscous crude oils than with relatively non-viscous oils.

Several procedures have been suggested to date for improving the mechanisms of solvent flooding, particularly with the view to reduce the degree of fingering and bypassing. One suggestion has been to increase the viscosity of the leading solvent bank relative to the oil by incorporating soluble viscosity increasing agents within the solvent. While these materials are effective to a certain extent in increasing the viscosity of the solvent banks, they are also characterized by certain disadvantages. For example, some of the materials have a tendency to plug the formation; some are relatively unstable; some have relatively little thickening effect; and most are not equally compatible with both the solvent bank and the following surfactant bank. Additionally, these materials are quite expensive, and often their use is not feasible from the standpoint of economics.

SUMMARY OF THE INVENTION

This invention relates to a method of miscibly displacing a reservoir crude oil utilizing a first bank of polar organic solvent and tall oil additive, a second bank of aqueous surfactant solution, and a following bank of flood water. The tall oil additive increases the viscosity of the first bank and thereby improves the mobility ratio between the first bank and the reservoir oil. The tall oil additive also reduces the cost of the first bank and increases the overall recovery of the process.

It is an object of this invention to improve the recovery of oil from subterranean formations. It is a further object of this invention to improve the areal sweep efficiency of a solvent recovery process. It is a further object of this invention to reduce the cost of the polar organic solvent bank employed in a multi-bank displacement process for the recovery of oil.

DESCRIPTION OF THE PREFERRED EMBODIMENT

The flow behavior of a solvent bank in a porous, permeable reservoir and the mechanism by which it miscibly displaces the reservoir oil has been the subject of several prior disclosures. Miscible displacement is generally recognized as a preferred mechanism of oil recovery since much smaller, more economical banks of injected solution can be employed to obtain maximum oil recovery.

It is known that a solvent bank which is substantially immiscible or has only limited solubility with water can itself be efficiently recovered, in a manner closely analogous to miscible displacement, by injecting an aqueous surfactant solution, preferably followed by ordinary water or brine. The flow behavior and the mechanism by which the solvent and surfactant solution are displaced resembles true miscible displacement.

When the term "miscible" is applied to the solubility relationship of two liquids, it is often used in a special, technical sense. Two liquids are miscible in that sense when they can be mixed in all proportions without phase separation. While the term "miscible displacement" is used to describe the recovery mechanism of this process, it should be understood that it is not necessary that the liquid banks be miscible as defined above. It can be shown that one liquid can miscibly displace another even though the two liquids are not themselves miscible. A full discussion of this phenomena is set forth in U.S. Patent application No. 803,702, filed Mar. 3, 1969.

It has now been found that such a process can be further improved by employing a tall oil additive in the polar organic solvent bank. The tall oil additive will increase the viscosity of the polar organic solvent bank and reduce the cost of such a bank. The additive has no appreciable adverse effect on the miscibility relationships between the polar organic solvent bank and the surfactant bank, and the additive improves the overall recovery of the solvent process.

The source of tall oil and its chemical derivatives is the pine tree. In the sulfate or kraft paper process, chips of pinewood are digested or cooked under pressure in an alkaline solution. This process frees the cellulose from the other wood constituents. The highly alkaline solutions form soluble sodium soaps of the lignins, rosins and fatty acids originally present as esters. These are washed out of the wood pulp as a dark solution known as "black liquor" which is concentrated in evaporators. When the partially-concentrated solution is cooled and allowed to settle, fatty acid and rosin soaps separate as a brown curdy mass called "black liquor" soap. This soap is skimmed off for further processing. The black liquor soap is initially acidulated to release free rosin acids and fatty acids from their salts, lignin and water soluble wood constituents. Separation of these products by decantation or centrifugation yields the free rosin and fatty acids or crude tall oil which is further processed by fractional distillation. The crude tall oil is charged into vacuum or steam fractionating towers. Generally, the crude tall oil enters the first of two fractionating towers where the high boiling constituents containing color bodies are removed from the bottom as tall oil pitch. The vapors then pass overhead into a second tower and are fractionated into tall oil rosins which are withdrawn from the bottom of the column and into tall oil fatty acids of varying rosin acid contents. At the top of the tower, lower boiling fatty acids and unsaponifiables are taken off as tall oil heads. Additions towers are commonly used to produce tall oil fatty acids of greater purity. These constituents including crude tall oil, tall oil pitch, tall oil rosin, tall oil fatty acids and tall oil heads are collectivey known as tall oil additives herein.

Tall oil pitch is preferred for use in the practice of this invention. Tall oil pitch is a semi-fluid, tar-like material composed of rosin acids and their esters, fatty acids and their esters, and unsaponifiables which are essentially a mixture of hydrocarbons, alcohols, and sterols. The pitch is employed in its natural, un-neutralized state and in this state it is soluble in oils and oil-like liquids but essentially insoluble in water. Tall oil pitch is the least expensive of the tall oil additives and has the greatest effect of the various tall oil additives in increasing the viscosity of the polar organic solvent bank. Table I illustrates the effect on viscosity of adding tall oil pitch to two suitable polar organic solvents.

TABLE I

| First bank composition, weight precent | Viscosity at room temperature, centipoises |
| --- | --- |
| 100% tertiary amyl alcohol | 5.2 |
| 85% tertiary amyl alcohol, 15% tall oil pitch | 9.4 |
| 70% tertiary amyl alcohol, 30% tall oil pitch | 19.7 |
| 100% secondary butyl alcohol | 3.2 |
| 85% secondary butyl alcohol, 15% tall oil pitch | 5.0 |
| 70% secondary butyl alcohol, 30% tall oil pitch | 11.1 |

In making the measurements set forth in Table I, the solutions were saturated with brine prior to determining the viscosity measurement. The purpose of saturating the solutions was to approximate as nearly as possible the conditions which would occur in an actual recovery process. As the polar organic solvent bank moves through a reservoir it will contact brine in the formation and the brine will dissolve in the solvent until its saturation limit is reached. To saturate the polar organic solvent solutions, equal volumes of the solvent and a standard brine were mixed and set aside until phase separation occurred. The brine-saturated solvent was then withdrawn and the viscosity measured. The standard brine solution contained:

| Ion: | Concentration—p.p.m. |
| --- | --- |
| $Na^+$ | 36,000 |
| $Ca^2$ | 2,960 |
| $Mg^2$ | 1,032 |
| $Ba^{2+}$ | 112 |
| $Cl^+$ | 64,000 |
| $HCO_3^-$ | 104 |

Tall oil pitch also reduces the cost of the first solvent bank. The following Table II illustrates the economic benefit achieved by employing tall oil pitch in this first bank.

TABLE II

| First bank composition weight percent | Estimated cost—$/bbl. |
| --- | --- |
| 100% tertiary amyl alcohol | 7.55 |
| 91.5% tertiary amyl alcohol, 8.5% tall oil pitch | 7.26 |
| 80% tertiary amyl alcohol, 20% tall oil pitch | 6.99 |

The quantity of tall oil additive employed in the polar organic solvent should not be so great that it adversely affects the solubility relationship between the polar organic solvent bank and the following surfactant bank. The effect of the tall oil additive on the system may be determined in the following manner. Sample vials containing a selected polar organic solvent and varying concentrations of tall oil additive are prepared. To each of such samples enough surfactant solution is added to create a single phase fluid in the absence of any quantity of the tall oil additive. The vials are then agitated to permit thorough mixing of the liquids and allowed to settle. If two distinct liquid phases are noted, the quantity of tall oil additive employed is excessive. It should be noted that addition of the aqueous surfactant solution may cause some precipitation of the tall oil additive. It may be necessary to filter the solutions to remove the precipitate before checking the phase relationships of the liquids.

The precipitation of a portion of the tall oil additive is not detrimental to the practice of this invention. This precipitation will only occur at the trailing edge of the polar organic solvent bank where it is contacted by the aqueous surfactant solution. The limited quantities which come out of the solution are not detrimental to the practice of this invention. This is demonstrated by the following three test floods set forth in Table III.

In these tests three 2" x 6" x 4' cores of Berea sandstone were saturated with the standard brine solution. The cores were then flooded with an Illinois Basin crude oil having a 42° API gravity and a viscosity of approximately 4 centipoises until residual water saturation was reached. Standard brine was then injected until no more oil could be produced and residual oil saturation was reached.

In the three comparative floods, the composition of the first bank liquid was the sole variable; all other factors were the same in each flood. The first bank liquid in Flood No. 1 was a polar organic solvent saturated with standard brine. The viscosity of this solution was approximately 5 centipoises. The first bank liquid in Flood No. 2 was a solution of 11 parts polar organic solvent and 1 part tall oil additive saturated with standard brine. The viscosity of this solution was approximately 7 centipoises. The first bank in Flood No. 3 was a solution of 4 parts polar organic solvent and 1 part tall oil additive saturated with standard brine. The viscosity of this solution was approximately 12 centipoises.

In each test flood, the first bank was displaced by a second bank of surfactant solution having the composition set forth in Table III. A polymeric viscosity increasing agent was included in these solutions to increase their viscosities to approximately 10 centipoises.

A one-half pore volume bank of one-quarter strength standard brine solution was then injected to displace the first and second bank solutions. A heteropolysaccharide viscosity-increasing agent was added to these third bank solutions to raise their viscosities to approximately 10 centipoises. The three banks in each instance were then displaced by a full strength standard brine solution having a viscosity of approximately 1.2 centipoises until no further oil was produced. The flood rate in each of these test floods was one foot per day. The results of these tests are set forth in Table III.

interfacial tension between the oil contaminated polar organic solvent bank and the following surfactant bank.

The polar organic solvents which are employed with the tall oil additive in accordance with this invention are organic liquids which are capable of miscibly displacing the reservoir oil and are capable of being miscibly displaced by the following aqueous surfactant silution. The solvents should have limited water solubility. If the solvent can dissolve large quantities of formation brine or connate water, the solvent will become insoluble in oil and incapable of miscibly displacing the reservoir oil. The solvent should also be capable of being miscibly displaced by the surfactant solution when the surfactant concentration is at or above the minimum miscibility concentration. The characteristics of the polar organic solvents which will govern its water solubility, its ability to miscibly displace reservoir oil, and its ability to be miscibly displaced by the surfactant solution include the type and degree of polar substitution, the degree of branching of the hydrocarbon, the molecular weight of the solvent, the type of carbon-carbon bonding in the hydrocarbon and the type surfactant employed in the aqueous surfactant solution. The ability of a particular polar organic solvent to perform its desired function can readily be determined by one skilled in the art of physical chemistry using routine laboratory testing.

Typical polar organic solvents which may be used in the practice of this invention in combination with the tall oil additive include the normal, secondary, tertiary, and cyclo-alcohols havin 4–16 carbon atoms per molecule; the normal, secondary, tertiary, and cyclo-amines having 6–12 carbon atoms per molecule; phenol and substituted phenols having side chains with 1–10 carbon atoms per molecule; normal, secondary, tertiary, and cyclo-mercaptans having 2–10 carbon atoms per molecule; fatty acids having 5–22 carbon atoms per molecule; ketones having 4–18 carbon atoms per molecule, ethers having 4–18 atoms per molecule; aldehydes having 4–18 carbon atoms per molecule; and mixtures of two or more of the above solvents. The carbon-carbon bonds of these solvents may be aliphatic, including saturates and unsaturates, cyclo-aliphatic or aromatic.

The preferred polar organic solvents are the low molecular weight alcohols including tertiary amyl alcohol, tertiary butyl alcohol, and secondary butyl alcohol. Tertiary amyl alcohol is particularly preferred because of its low cost and favorable solubility characteristics in

TABLE III

| Flood No. | Bank I Bank Composition, Weight Percent | Bank Size, Percent Pore Volume | Bank II Bank Composition, Weight Percent | Bank Size, Percent Pore Volume | Core Permeability/md. | Residual Oil Recovery at 1.3 Pore Volumes Total Fluid Injected Percent |
|---|---|---|---|---|---|---|
| 1 | 88% tertiary amyl alcohol, 12% standard brine. | 17.5 | 15% methyl alcohol, 15% sodium xylene sulfonate, 0.2% polymeric thickener, *70% standard brine (¼ strength). | 17 | 620 | 71.8 |
| 2 | 80.8% tertiary amyl alcohol, 7.2% tall oil pitch, 12% standard brine. | 17.5 | 15% methyl alcohol, 15% sodium xylene sulfonate, 0.2% polymeric thickener, *70% standard brine (¼ strength). | 17 | 916 | 84.7 |
| 3 | 70.6% tertiary amyl alcohol, 17.6% tall oil pitch, 11.8% standard brine. | 17.5 | 15% methyl alcohol, 15% sodium xylene sulfonate, 0.2% polymeric thickener, *70% standard brine (¼ strength). | 17 | 689 | 82.8 |

*Hydroxypropylmethylcellulose.

The addition of the tall oil additive not only lowers the cost of the first bank solution but also increases the amount of oil recovered by the process to a surprising degree. A part of the increase is probably due to the increased viscosity of the solvent bank; however, the full extent of the increased recovery can not be attributed solely to the increased viscosity. The tall oil additive apparently causes other mechanisms to take place which have not yet been explained. One possible explanation is that the tall oil additive reduces precipitation of asphaltic components of the crude oil otherwise caused by the polar organic solvent. The tall oil additive may also assist in lowering the crude oil-aqueous surfactant solution systems.

The polar organic solvent may be employed as a pure compound, a mixture of compounds or as a crude mixture containing other oxygenated hydrocarbon products or containing inert materials having no detrimental effect upon the ability of the solvent bank to displace the reservoir oil. For example, a suitable commercial source of oxygenated hydrocarbons comprising a crude mixture of alcohols, ketones, acids and aldehydes may be obtained by the direct catalytic reaction of air or other oxygen-comprising gas with light paraffinic or olefinic hydrocarbons, such as a light petroleum distillate, in accordance with known procedures. The injected solvent may contain water or brine up to the limit of its solubility therein. Solvent recovered at production wells may be separated from the oil and reinjected elsewhere in the same reservoir, or in a separate reservoir.

Suitable surfactants include water soluble anionic and non-ionic compounds including sulfonated aromatic hydrocarbons, sulfonated aromatic hydrocarbons with aliphatic or cyclic substituents, ethylene oxide condensates of aliphatic acids, alkyl aryl polyalkalene glycol ethers, esters of sulfosuccinic acid, mono- and dibasic carboxylic acids, and alkyl sulfates. Cationic surfactants may also be employed, but are less preferred due to the tendency of such materials to strongly adsorb on the formation surface.

The preferred surfactants for injection in aqueous solution to displace the polar solvent bank are the alkali metal and ammonium salts of benzene sulfonic acid, naphthalene, sulfonic acid, and alkyl aryl sulfonic acids having 7–13 carbon atoms per molecule. Of the preferred surfactants, the alkyl benzene sulfonates having one to seven alkyl carbons per molecule are generally superior. Specific examples include toluene sulfonate, cumene sulfonate, normal amyl benzene sulfonate, xylene sulfonate, tertiary and normal butyl benzene sulfonate, and butyl toluene sulfonate. Preferably, there sulfonates are injected as alkali metal or ammonium salts; however, the sulfonic acids may be injected as such without neutralization. To some extent, the acids react with the reservoir rock to form salts in situ.

The short-chain alkyl benzene sulfonates are far superior to the well-known long-chain alkyl benzene sulfonate, primarly because of the solubility of their calcium and magnesium salts, and their much lower adsorbtivity on reservoir rock or clay. They are compatible in aqueous solutions with polymeric thickeners used to improve the mobility ratio between the sulfonate bank and the solvent bank it displaced.

The concentration of surfactant useful in accordance with the present invention lies in the range of about 2 percent by weight up to the solubility limit of the surfactant, preferably from 5 percent to 40 percent by weight. The concentration level to be employed in a given system to permit miscible displacement of the polar organic solvent bank and to permit miscible displacement by the following flood water is the minimum miscibility concentration.

It is also contemplated that viscosity-increasing agents may be employed in the various banks and following flood water used in the practice of this invention. Such viscosity-increasing agents are well-known to those skilled in the art and a suitable viscosity increaser for a given fluid can be readily selected. It is only important that the viscosity-increasing agent be soluble in the fluid at the concentration level necessary to give the desired viscosity, be compatible with its carrier fluid, i.e., does not complex with other components of the fluid or precipitate, and not be strongly adsorbed in the formation surface. Representative viscosity increasing agents are partially hydrolyzed polyacrylamides and heteropolysaccharides of the type disclosed in U.S. 3,305,016, Lindbloom et al. Where the viscosity-increasing agent is added to a bank which contains an alcohol or to a bank which may contact appreciable quantities of alcohol contained in a preceeding bank, a viscosity-increasing agent such as hydroxypropylmethylcellulose may be advantageously employed. Such agents have excellent compatibility with alcohol solutions. A suitable hydroxypropylmethylcellulose compound is manufactured by the Dow Chemical Company and sold under the tradename Methocel 90 H G. It should be understood, however, that the use of such viscosity-increasing agents are mentioned by way of example and do not form any part of my invention.

In the practice of this invention, the volume of the first bank (polar organic solvent-tall oil additive) solution and the volume of the second bank (aqueous surfactant) solution should each be from about 3 percent to about 20 percent of the reservoir pore volume. For economic reasons it is preferred that these banks be relatively small. However, a number of factors, including primarily the presence of reservoir heterogeneities, may require the use of larger volume banks.

The invention is further illustrated by the following example:

EXAMPLE I

A petroleum reservoir is waterflooded in a conventional manner to a residual oil saturation of about 30 percent of the reservoir pore volume. In accordance with the present invention, a first bank solution containing 90 weight percent tertiary amyl alcohol and 10 weight percent tall oil pitch is then injected at a selected number of input wells in an amount corresponding to 5 percent of the total reservoir pore volume. Thereafter, a second bank solution containing 15 weight percent sodium xylene sulfonate, 15 weight percent methanol, and 5 weight percent dissolved inorganic salts is injected into the same input wells. The total amount of second bank solution injected corresponds to 5 percent of the reservoir pore volume. Thereafter, a 30 percent pore volume third bank solution of thickened water is injected through the same input wells. The water is thickened by the addition of 0.05 weight percent of a heteropolysaccharide. The thickened water bank is then followed by water or brine until about 2.0 pore volumes of cumulative flooding medium has been injected. The 2.0 pore volumes injected include the first, second, and third bank solutions and the following water or brine. Recovery of reservoir oil from the sections contacted by the injected fluids is essentially complete indicating a miscible displacement.

What is claimed is:
1. A method for the recovery of oil from a subterranean oil-bearing formation comprising:
   (a) injecting into the formation a solution comprising a tall oil additive and a polar organic solvent;
   (b) injecting into the formation an aqueous solution of a surfactant, the concentration of surfactant in said aqueous solution being at least equal to the minimum miscibility concentration; and
   (c) recovering oil from the formation.
2. A method as defined in claim 1 wherein the tall oil additive is tall oil pitch.
3. A method as defined in claim 1 wherein the tall oil additive is crude tall oil.
4. A method as defined in claim 1 further including displacing the polar organic solvent-tall oil solution and aqueous surfactant solution into the formation by an aqueous flood medium.
5. A method as defined by claim 1 wherein the polar organic solvent-tall oil solution and the aqueous surfactant solution are injected into the reservoir by means of an input well and oil is recovered from the formation by means of a withdrawal well.

References Cited

UNITED STATES PATENTS

| | | | |
|---|---|---|---|
| 3,163,214 | 12/1964 | Csaszar | 166—274 |
| 3,303,879 | 2/1967 | Williams | 166—275 X |
| 3,323,589 | 6/1967 | Harvey | 166—274 |
| 3,330,344 | 7/1967 | Reisberg | 166—275 X |
| 3,373,809 | 3/1968 | Cooke | 166—275 X |
| 3,444,930 | 5/1969 | Williams et al. | 166—273 |
| 3,446,282 | 5/1969 | Cooke | 166—274 |

STEPHEN J. NOVOSAD, Primary Examiner